US011095527B2

(12) United States Patent
Yasuda

(10) Patent No.: US 11,095,527 B2
(45) Date of Patent: Aug. 17, 2021

(54) DELAY PREDICTION DEVICE, DELAY PREDICTION SYSTEM, DELAY PREDICTION METHOD, AND RECORDING MEDIUM

(71) Applicant: NEC CORPORATION, Tokyo (JP)

(72) Inventor: Shinya Yasuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 45 days.

(21) Appl. No.: 16/492,453

(22) PCT Filed: Mar. 7, 2018

(86) PCT No.: PCT/JP2018/008742
§ 371 (c)(1),
(2) Date: Sep. 9, 2019

(87) PCT Pub. No.: WO2018/168601
PCT Pub. Date: Sep. 20, 2018

(65) Prior Publication Data

US 2020/0052974 A1 Feb. 13, 2020

(30) Foreign Application Priority Data

Mar. 16, 2017 (JP) ............................ JP2017-051409

(51) Int. Cl.
*H04L 12/24* (2006.01)
*H04L 12/26* (2006.01)
*H04L 12/801* (2013.01)

(52) U.S. Cl.
CPC ........ *H04L 41/147* (2013.01); *H04L 43/0864* (2013.01); *H04L 47/127* (2013.01)

(58) Field of Classification Search
None
See application file for complete search history.

(56) References Cited

U.S. PATENT DOCUMENTS

2008/0219180 A1* 9/2008 Bedrosian ............... H04L 43/50 370/252
2009/0116402 A1* 5/2009 Yamasaki ............ H04L 43/024 370/253
2009/0147806 A1* 6/2009 Brueckheimer ...... H04J 3/0667 370/503

FOREIGN PATENT DOCUMENTS

JP 4601232 B2 12/2010
JP 2011-228823 A 11/2011

OTHER PUBLICATIONS

V. Paxson et al., "Computing TCP's Retransmission Timer", [online], Jun. 2011, IETF, [retrieved on Feb. 17, 2017], pp. 1-11, Internet <URL: https://tools.ietf.org/html/rfc6298>.

(Continued)

*Primary Examiner* — Jason E Mattis
*Assistant Examiner* — Hong Shao
(74) *Attorney, Agent, or Firm* — Sughrue Mion, PLLC

(57) ABSTRACT

Provided is a delay prediction device for predicting a future communication delay with high accuracy based on past communication delay data. Delay prediction device includes: a low delay distribution estimation unit that estimates a probability distribution of a first communication delay state by using a result of measuring a communication delay of a packet in a network; identification unit that identifies whether a state of the communication delay is the first communication delay state or a second communication delay state in which the communication delay is greater than the communication delay in the first communication delay state; high delay distribution estimation unit that estimates a probability distribution of the second communication delay state; and delay distribution prediction unit that predicts a probability distribution of a future communication delay, based on a probability distribution of the first communica- (Continued)

10
DELAY PREDICTION DEVICE
LOW DELAY DISTRIBUTION ESTIMATION UNIT 11
IDENTIFICATION UNIT 12
HIGH DELAY DISTRIBUTION ESTIMATION UNIT 13
DELAY DISTRIBUTION PREDICTION UNIT 14
DELAY TIME MEASUREMENT UNIT 15 tion delay state and a probability distribution of the second communication delay state.

16 Claims, 11 Drawing Sheets

(56) References Cited

OTHER PUBLICATIONS

International Search Report of PCT/JP2018/008742 dated Apr. 10, 2018 [PCT/ISA/210].
Written Opinion of PCT/JP2018/008742 dated Apr. 10, 2018 [PCT/ISA/237].

* cited by examiner 100
17
CONTROL TARGET DEVICE
3 COMMUNICATION NETWORK
10a
DELAY PREDICTION DEVICE
11
LOW DELAY DISTRIBUTION ESTIMATION UNIT
12
IDENTIFICATION UNIT
13
HIGH DELAY DISTRIBUTION ESTIMATION UNIT
14a
DELAY DISTRIBUTION PREDICTION UNIT
15
DELAY TIME MEASUREMENT UNIT
16
CONTROL UNIT

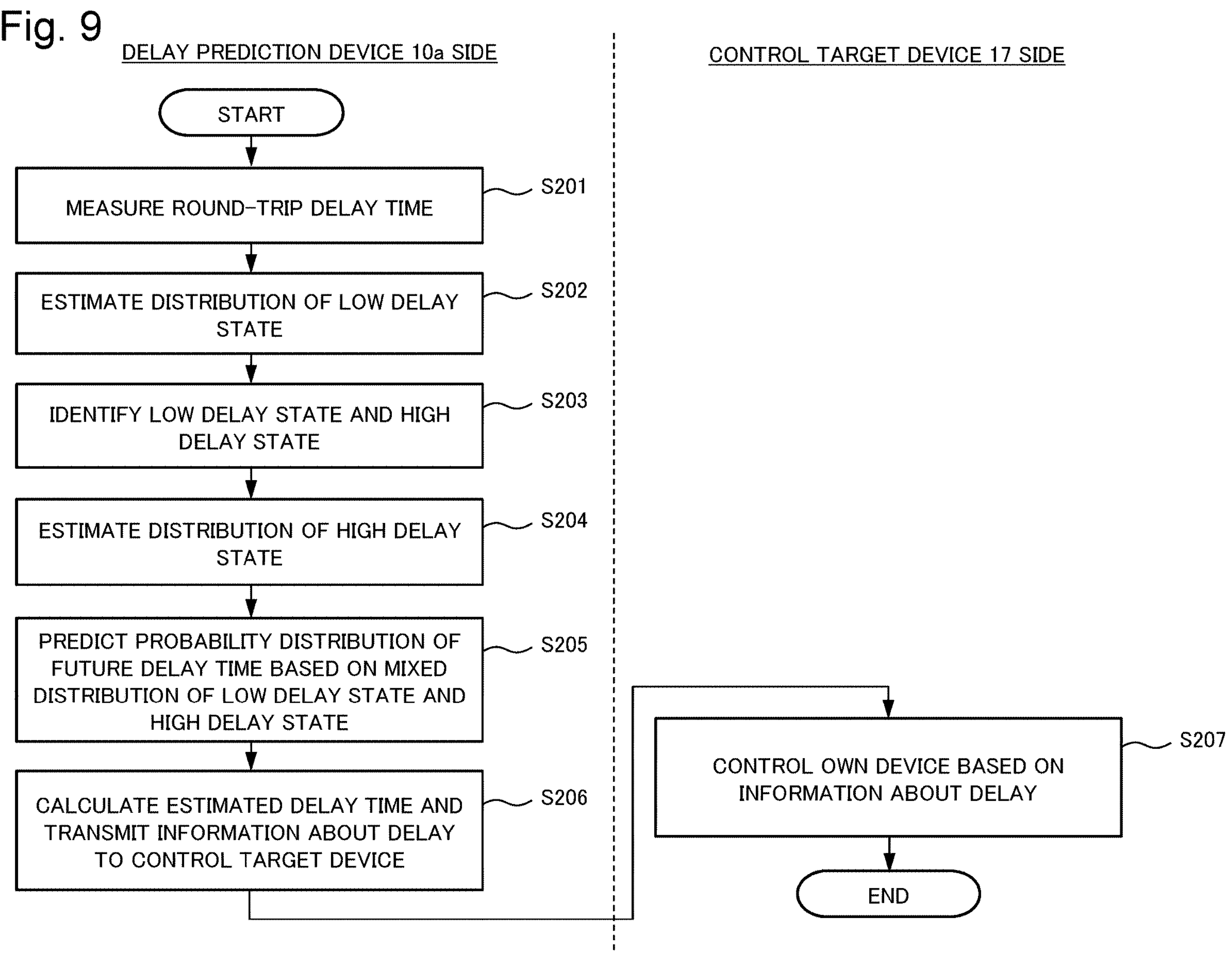
Fig. 9
DELAY PREDICTION DEVICE 10a SIDE
CONTROL TARGET DEVICE 17 SIDE
START
MEASURE ROUND-TRIP DELAY TIME
S201
ESTIMATE DISTRIBUTION OF LOW DELAY STATE
S202
IDENTIFY LOW DELAY STATE AND HIGH DELAY STATE
S203
ESTIMATE DISTRIBUTION OF HIGH DELAY STATE
S204
PREDICT PROBABILITY DISTRIBUTION OF FUTURE DELAY TIME BASED ON MIXED DISTRIBUTION OF LOW DELAY STATE AND HIGH DELAY STATE
S205
CALCULATE ESTIMATED DELAY TIME AND TRANSMIT INFORMATION ABOUT DELAY TO CONTROL TARGET DEVICE
S206
CONTROL OWN DEVICE BASED ON INFORMATION ABOUT DELAY
S207
END 1
501
CPU
510
INPUT/OUTPUT INTERFACE
508
COMMUNICATION INTERFACE
509
511 BUS
505
STORAGE DEVICE
PROGRAM
504
RAM
503
ROM
502
DRIVE DEVICE
507
506

DELAY PREDICTION DEVICE, DELAY PREDICTION SYSTEM, DELAY PREDICTION METHOD, AND RECORDING MEDIUM

CROSS REFERENCE TO RELATED APPLICATIONS

This application is a National Stage of International Application No. PCT/JP2018/008742, filed Mar. 7, 2018, claiming priority to Japanese Patent Application No. 2017-051409, filed Mar. 16, 2017, the contents of all of which are incorporated herein by reference in their entirety.

TECHNICAL FIELD

The present invention relates to a technique of predicting a delay time required for transmission and reception of packets in internet protocol (IP) communication.

BACKGROUND ART

Along with recent popularization of the Internet and widespread use of multi-devices, the number of devices that use IP communication has been increasing.

However, in such communication networks, a loss of packets to be transmitted and received occurs and a communication delay time also varies from hour to hour due to various factors such as interference between radio waves, noise, and congestion of communication lines. When a large communication delay occurs suddenly, for example, in a remote control system, it becomes difficult to control a device to be operated. Specifically, in a case where the device to be operated is moved by remote control in the system, an operator or an operation program is intended to control the device to be operated to stop at a certain position, but actually, the operator or the operation program makes the device to be operated moved at an unintended position due to a transmission delay of a stop instruction caused by a communication delay. When the communication delay occurs steadily, a control operation in which the communication delay is taken into consideration in advance may be performed. However, a high technical level is required to cope with the communication delay that suddenly occurs.

Effects of problems caused due to sudden occurrence of a communication delay can be reduced by predicting the communication delay. For example, in communication using a transmission control protocol (TCP), when there is a lack in information even after a lapse of a predetermined time, the lacked information is retransmitted to thereby realize the communication with reliability. Specifically, a transmission source terminal transmits a packet, and then waits for transmission, from a reception source terminal, of a special packet indicating that the packet is received. When there is no response for a certain period of time, the transmission source terminal attempts to retransmit the packet. When this wait time is extremely short, extra retransmission occurs. On the other hand, when a wait time is extremely long, reproduction of a required packet is not executed quickly. In either case, a throughput deteriorates. In the case of remote control, when a predicted delay time is large, an operation speed of a target device is decreased as compared with a case where the predicted delay time is small, thereby making it possible to reduce a difference between an actual stop position and an intended stop position.

A line utilization status and a radio wave status vary from hour to hour. In the case of a public line, information about users other than a user himself/herself cannot be achieved, and thus it is extremely difficult to theoretically and specifically predict a future communication delay time. Accordingly, an attempt is made to acquire information about the future communication delay by using a history of information about past communication delay that has occurred in the past in an own device.

NPL 1 discloses a technique of providing a standard method of determining the wait time in TCP/IP communication. In this method, a round-trip delay time is measured every certain period of time, an estimated value of the round-trip delay time in the next step is calculated as an exponential average thereof, and a value that is four times as large as a predicted value of a variation of the wait time is added to the calculated estimated value to thereby set the wait time. Thus, the wait time with an allowance on the safety side is set in such a way as to reduce the necessity for wasteful retransmission.

PTL 1 discloses a method of improving the technique described in NPL 1. In the method disclosed in PTL 1, processing to be performed when the round-trip delay time decreases is made different from processing to be performed when the round-trip delay time increases, thereby avoiding setting of an unnecessarily long wait time when the round-trip delay time decreases. In addition, a deterioration in throughput can be suppressed.

CITATION LIST

Patent Literature

[PTL 1] Japanese Patent No. 4601232

Non Patent Literature

[NPL 1] V. Paxson, and three others, “Computing TCP's Retransmission Timer”, [online], June 2011, IETF, [retrieved on Feb. 17, 2017], Internet <URL: https://tools.ietf.org/html/rfc6298>

SUMMARY OF INVENTION

Technical Problem

However, the techniques disclosed in NPL 1 and PTL 1 have the following problems.

NPL 1 has a problem that, even in a case where a round-trip delay time has rapidly decreased and a line status has improved, a control device recognizes that the round-trip delay time varies greatly and sets an extremely long wait time for the subsequent step.

In both of the techniques disclosed in NPL 1 and PTL 1, a maximum value of a future round-trip delay time is point-estimated as a value as small as possible, based on the round-trip delay time measured every certain period of time. In particular, the technique disclosed in PTL 1 has an advantage that an estimated delay time smaller than that in NPL 1 can be calculated by retrieving a decrease in the round-trip delay time at a timing when the line state is stabilized as a decrease in the estimated delay time.

However, when the round-trip delay time is actually measured, a sudden increase in delay time, which has suddenly occurred due to some reason, is often observed. It is difficult for the techniques disclosed in NPL 1 and PTL 1 to predict such a sudden increase in delay time. Further, after the delay time has decreased, the sudden increase in delay time has an effect on the estimated delay time (remains as an increase in delay time). Accordingly, for example, in the case of retransmitting a packet in TCP/IP communication, a wasteful wait time occurs. In addition, when the sudden increase in delay time is intermittently repeated, the delay is underestimated at a time point when the delay time increases, and the delay is repeatedly overestimated at a time point when the delay time decreases. This makes it difficult to cope with the deterioration in throughput.

The present invention has been made in view of the above-described problems, and an object of the present invention is to provide a delay prediction device for predicting a future communication delay with high accuracy, based on past communication delay data.

Solution to Problem

To solve the above problem, a first aspect of a delay prediction device according to the present invention includes:

a low delay distribution estimation means that estimates a probability distribution of a first communication delay state by using a result of measuring a communication delay of a packet in a network;

an identification means that identifies whether a state of the communication delay is the first communication delay state or a second communication delay state in which the communication delay is greater than the communication delay in the first communication delay state;

a high delay distribution estimation means that estimates a probability distribution of the second communication delay state; and a delay distribution prediction means that predicts a probability distribution of a future communication delay, based on a probability distribution of the first communication delay state and a probability distribution of the second communication delay state.

A second aspect of a delay prediction system according to the present invention includes:

The above delay prediction device;

a control device that execute remote control of an operation via a network;

a control target device that executes the operation in response to the remote control from the delay prediction device, the delay prediction device, the control device and the control target device being communicably connected, wherein the control device receives, by the delay prediction device, predicted delay information including a future delay time based on a communication delay predicted by using a result of measuring a communication delay of a packet in the network, and determines the remote control for the control target device based on the predicted delay information.

A third aspect of a delay prediction method according to the present invention includes:

estimating a probability distribution of a first communication delay state by using a result of measuring a communication delay of a packet in a network;

identifying whether a state of the communication delay is the first communication delay state or a second communication delay state in which the communication delay is greater than the communication delay in the first communication delay state;

estimating a probability distribution of the second communication delay state; and predicting a probability distribution of a future communication delay, based on a probability distribution of the first communication delay state and a probability distribution of the second communication delay state.

A fourth aspect of a delay prediction program according to the present invention causes a computer to execute:

estimating a probability distribution of a first communication delay state by using a result of measuring a communication delay of a packet in a network;

identifying whether a state of the communication delay is the first communication delay state or a second communication delay state in which the communication delay is greater than the communication delay in the first communication delay state;

estimating a probability distribution of the second communication delay state; and predicting a probability distribution of a future communication delay, based on a probability distribution of the first communication delay state and a probability distribution of the second communication delay state.

Advantageous Effects of Invention

According to the present invention, it is possible to provide a delay prediction device for predicting a future communication delay with high accuracy, based on past communication delay data.

BRIEF DESCRIPTION OF DRAWINGS

FIG. 9 is a flowchart illustrating an operation of the delay prediction system according to the second example embodiment of the present invention;

EXAMPLE EMBODIMENT

First, a basic principle of delay prediction device 10 (see FIG. 1) according to a first example embodiment of the present invention will be described.

A sudden increase in delay time in a communication network is caused due to a plurality of complex intertwined factors, such as the strength of received radio waves and a cross traffic state. It is difficult to perform the prediction by point estimation as described above.

However, since a sudden increase in delay time is caused intermittently over a certain period of time, how much communication delay occurs within which time in the past can be converted into a numerical value. Then, a frequency distribution of a future delay time is estimated, whereby the estimated frequency distribution can be utilized for prediction of a variation in the future delay.

Figure 2:
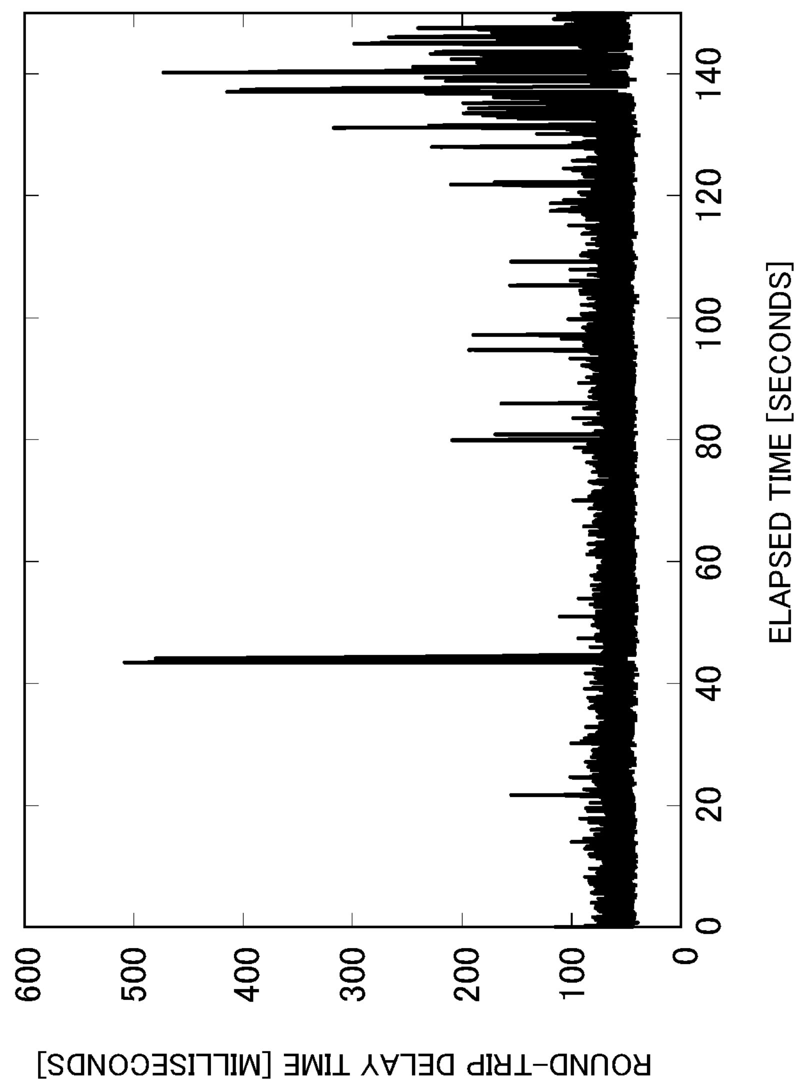
FIG. 2 is a graph illustrating a time dependence of a round-trip delay time actually measured by using a Long Term Evolution (LTE) line.

FIG. 2 is a graph illustrating a time dependence of a round-trip delay time actually measured by using an LTE line. In the graph, a vertical axis represents a round-trip delay time (milliseconds) and a horizontal axis represents an elapsed time (seconds). In this graph, during a period from 40 seconds to 60 seconds on the horizontal axis, a large delay, such as a round-trip delay time of about 500 milliseconds, i.e., a state where a delay time observed within an observation time is relatively larger than other delay times (hereinafter, referred to as a "high delay state") occurs. However, this delay is relaxed in several seconds, and then a round-trip delay time of about 50 milliseconds in average, i.e., a state where a delay time observed within an observation time is relatively smaller than other delay times (hereinafter, referred to as a "low delay state") occurs. After that, during a period from 80 seconds to 120 seconds, a delay of a round-trip delay time of about 200 milliseconds intermittently occurs, and then during a period between 120 seconds to 140 seconds, and further after 140 seconds, a delay of a round-trip delay time of about 300 milliseconds in average intermittently occurs.

Figure 3:
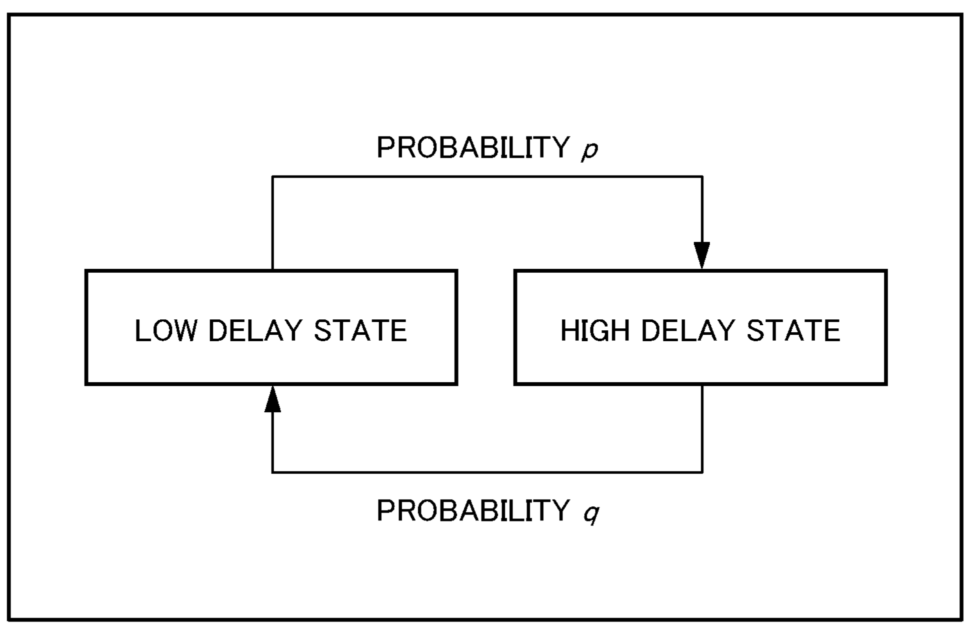
FIG. 3 is a diagram illustrating a state transition between a low delay state and a high delay state.

As seen from this graph, the delay time transitions from the low delay state (first communication delay state) to the high delay state (second communication delay state), and after a lapse of a predetermined time, the delay time returns from the high delay state to the low delay state again. This transition is repeated. Note that FIG. 3 illustrates this transition as a state transition diagram. In this example embodiment, a probability of transition from the low delay state to the high delay state is represented by p, and a probability of transition from the high delay state to the low delay state is represented by q. Assuming that the state transition illustrated in FIG. 3 is a simple Markov process, an expected value of a ratio of time for the low delay state is represented by $\{q/(p+q)\}$, and an expected value of a ratio of time for the high delay state is represented by $\{p/(p+q)\}$.

Delay prediction device 10 quantifies, from actual measurement data (see FIG. 2) on communication delays measured a plurality of times, a degree of contribution from the low delay state at times when the delay is measured, by using the probability p and the expected value described above. Further, delay prediction device 10 quantifies the degree of contribution from the high delay state by using the probability q and the expected value described above.

The probability p and the probability q are calculated intermittently (regularly or irregularly) from past data per certain duration, or per measurement score. For example, in the following example, the probability p and the probability q are calculated every elapsed time of $\Delta T=20$ seconds. Note that an interval of elapsed times is merely an example. In practice, a little smaller time interval is set in many cases.

Further, a transition between the probability p and the probability q in a certain period of time is achieved in chronological order from a plurality of durations arranged in chronological order. Accordingly, it is possible to predict a future probability p and a probability q based on the transition.

The probability p and the probability q are associated with a shape of a probability distribution of delay times (described in detail later). Accordingly, a pair of values of the future probability p and probability q is predicted, whereby the delay time distribution related to the pair of values can be achieved, and a future delay can be predicted based on the delay time distribution.

A delay prediction device according to a first example embodiment of the present invention will be described below.

First Example Embodiment (Delay Prediction Device)

Figure 1:
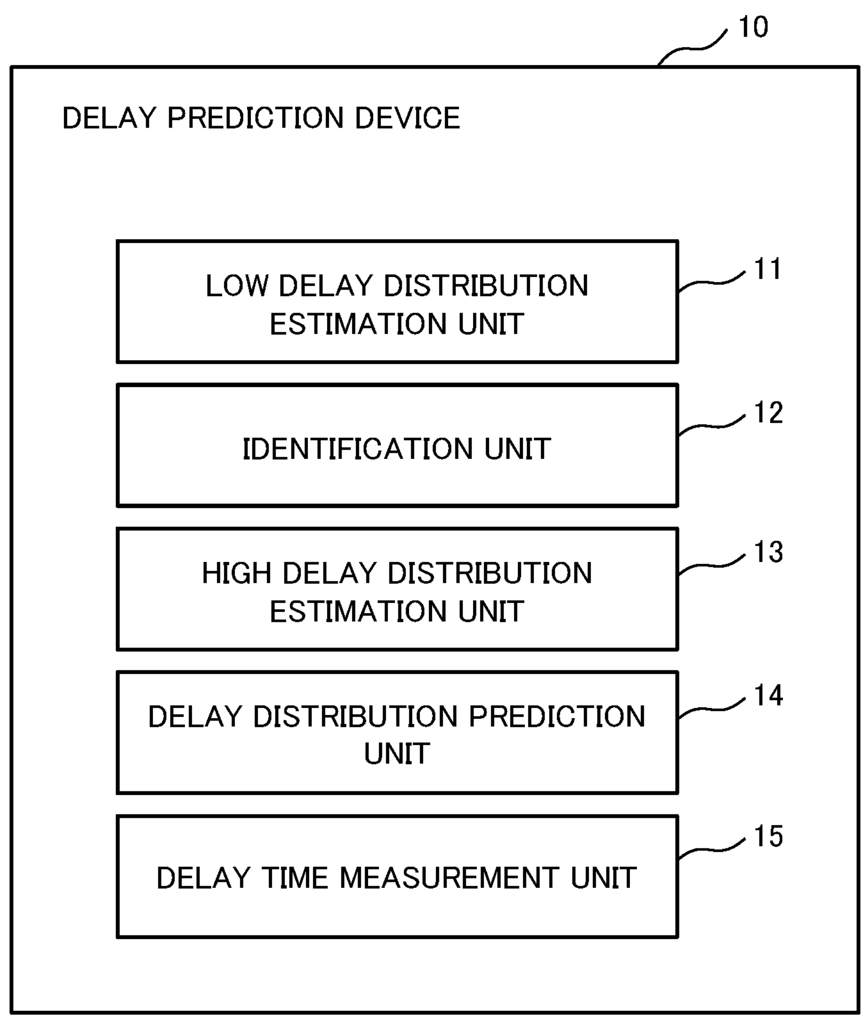
FIG. 1 is a diagram illustrating a configuration example of a delay prediction device according to a first example embodiment of the present invention.

As illustrated in FIG. 1, delay prediction device 10 according to the first example embodiment of the present invention includes low delay distribution estimation unit 11, identification unit 12, high delay distribution estimation unit 13, delay distribution prediction unit 14, and delay time measurement unit 15.

Figure 4:
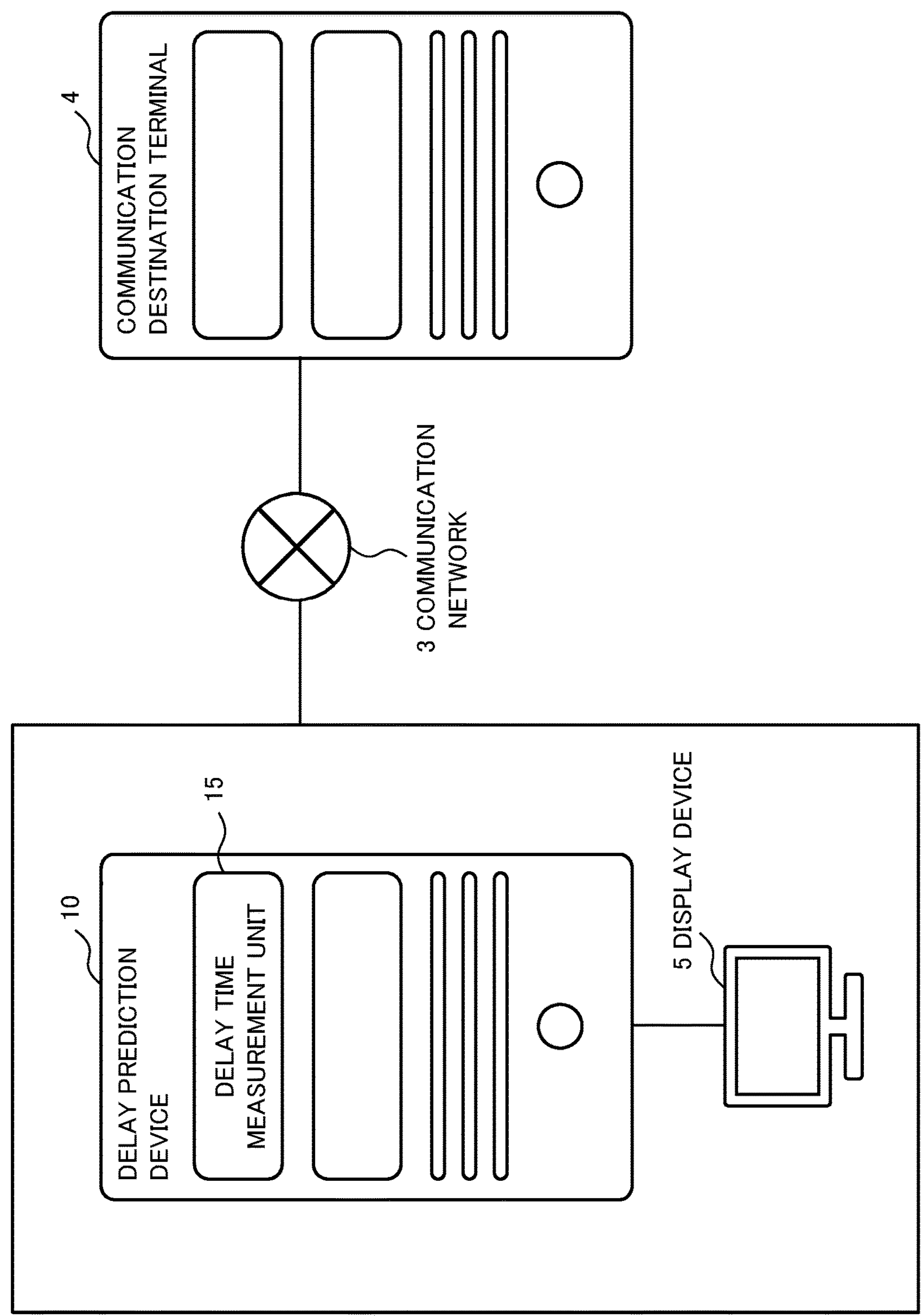
FIG. 4 is a diagram illustrating a configuration example of a device used when the delay prediction device measures a communication delay.

Delay time measurement unit 15 causes packets to flow a plurality of times through a communication network, thereby measuring a delay time in advance. FIG. 4 illustrates a configuration of a device used during measurement of a delay time. Delay time measurement unit 15 of delay prediction device 10 performs packet communication with communication destination terminal 4 via communication network 3. Specifically, a time when delay time measurement unit 15 transmits a packet is recorded on a memory, which is not illustrated, and delay prediction device 10 transmits a packet to communication destination terminal 4. Upon receiving the packet from delay prediction device 10, communication destination terminal 4 promptly returns a packet to delay prediction device 10. Upon receiving the packet returned from delay prediction device 10, delay time measurement unit 15 calculates a difference between the reception time and the transmission time that is preliminarily recorded on the memory, thereby achieving a round-trip delay time (Round Trip Time) which is a time required for the packet to make a round trip across communication network 3. Note that delay prediction device 10 can be connected to display device 5 and the round-trip delay time can be displayed by a graph, numbers, or the like.

Note that in the case of User Datagram Protocol (UDP) communication, since the reliability of a communication path cannot be generally ensured, a transmitted packet may be lost before the transmitted packet reaches communication destination terminal 4, or before a packet returned from communication destination terminal 4 reaches delay prediction device 10. Accordingly, in the UDP communication, delay time measurement unit 15 uses a predetermined time-out value. When the packet is not returned to delay prediction device 10 even after a lapse of time related to the time-out value, delay time measurement unit 15 assumes an appropriate time greater than or equal to the time-out value as the round-trip delay time and records the round-trip delay time (temporarily places the round-trip delay time) on the memory, thereby preventing a data loss.

Note that, also in this case, delay time measurement unit 15 may hold a temporary flag value and may replace the temporarily placed round-trip delay time with an actually-measured value by referring to the temporary flag value when the packet is subsequently returned with a large delay. Although one example of the measurement method has been described herein above by taking the round-trip delay time as an example, delay time measurement unit 15 in this example embodiment is not necessarily limited to the measurement of the round-trip delay time. For example, delay time measurement unit 15 may measure a delay time in a one-way trip, and delay prediction device 10 may use the measured delay time in the one-way trip.

Figure 5:
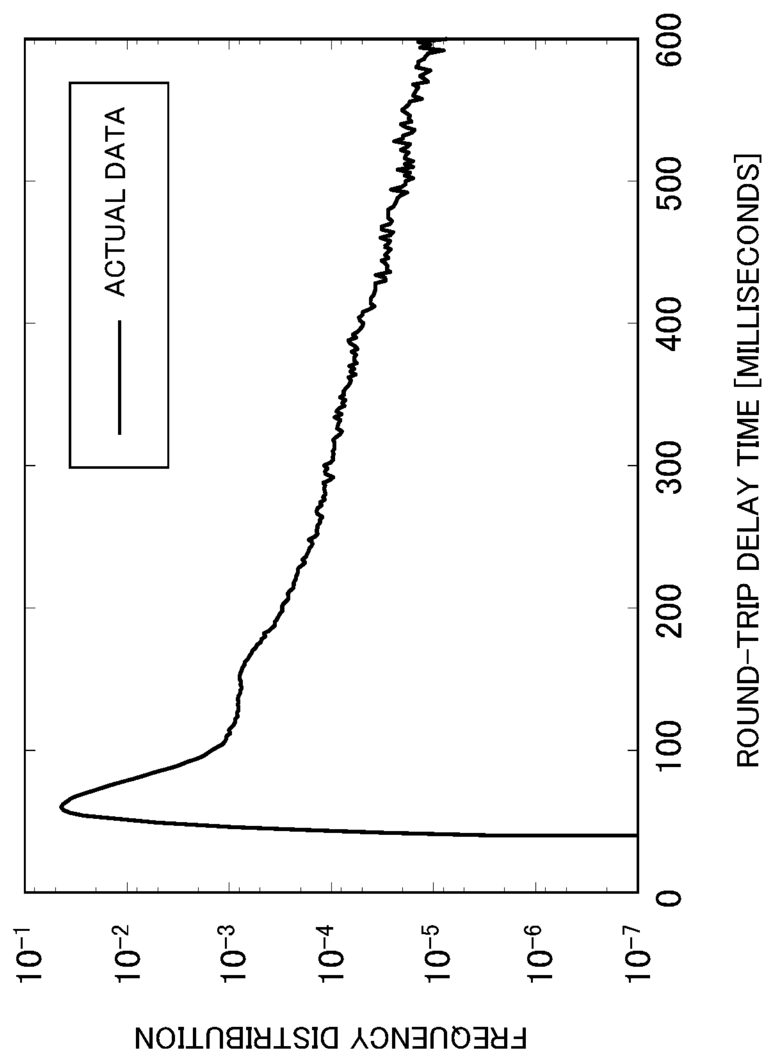
FIG. 5 is a graph illustrating a frequency distribution of a round-trip delay time actually measured by using an LTE line.

Low delay distribution estimation unit 11 estimates a probability distribution of a low delay state by using a result of measuring the communication delay of a packet in the network (output from the delay time measurement unit 15). Assuming that data on a relatively short delay time among the measured delay times are in a low delay state, low delay distribution estimation unit 11 estimates the probability density (function) of the delay time related to the low delay state. For example, FIG. 5 is a graph illustrating actually measured delay times. The left side (between about 0 to 20 seconds on the horizontal axis) of the graph represents a probability density function of the low delay state. Note that a threshold that clearly distinguishes the low delay state from the high delay state will be described in detail next with regard to identification unit 12.

When low delay distribution estimation unit 11 estimates the probability distribution, it is assumed that the estimated distribution is a distribution in which a certain hypothesis is provided for a parameter that defines the characteristic of a population (hereinafter, referred to as a parametric distribution). In this case, the estimation of the distribution results in a problem of estimating a small number of parameters, which facilitates the estimation of the distribution. It is assumed herein that, for example, the low delay distribution is a gamma distribution with a shift as represented by Equation (1).

[Math. 1]

$$f(x) = (x-z)^{k-1}\frac{\exp[-(x-z)/\theta]}{\Gamma(k)\theta^k} \quad (x \geqq z) \tag{1}$$

In Equation (1), f(x) represents a probability density, z represents a parameter (coefficient) for shift, k represents a shape parameter, and θ represents a scale parameter. k and θ are parameters for determining a shape of the gamma distribution. The parameter z is related to a lower limit of the domain of the gamma distribution. In other words, since a delay time in a communication path is generally greater than zero, a normal gamma distribution is moved in parallel in an x-axis direction by z to indicate that the delay time is greater than or equal to z. In this case, the gamma distribution is used as an example. However, low delay distribution function is not necessarily the gamma distribution, and any distribution may be used.

One example of a parameter determination method by low delay distribution estimation unit 11 when the gamma distribution represented by Equation (1) is used will be described below. As descried above, z is the parameter indicating a degree of shifting of a zero point of the gamma distribution function in an x-direction. Accordingly, a distribution minimum value should be given. Therefore, low delay distribution estimation unit 11 acquires a minimum value in data on the round-trip delay time achieved by actual measurement, and uses the acquired minimum value as z. k is one of the parameters for determining a shape of the gamma distribution, and is, for example, a value from about 1 to 10. When the two parameters (z and k) are determined, a percentage point (percentile) depends only on the parameter θ. Accordingly, low delay distribution estimation unit 11 estimates the parameter θ by comparing a theoretical value with a percentage point when the parameter θ is set by using information indicating, for example, which value is measured as the round-trip delay time at a low-order percentage point in the achieved actual measurement data. Specifically, for example, assuming that the central value (i.e., a low-order 50% point) of the measured delay time is 70 milliseconds, a cumulative distribution function F(x) in Equation (1) is represented by the following Equation (2).

[Math. 2]

$$F(x) = \frac{\int_0^{(x-z)/\theta} t^{k-1} e^{-t}\,dt}{\Gamma(k)} \tag{2}$$

When Equation (2) is used, the estimated value of the parameter θ is determined as a solution to F(70)=0.5.

Identification unit 12 identifies whether the state of the communication delay is the low delay state or the high delay state in which the communication delay is greater than the communication delay in the low delay state. Identification unit 12 determines a threshold for distinguishing the low delay state from the high delay state. For example, like the gamma distribution described above, when the (infinite) distribution with no domain maximum value is considered as the low delay state, for example, the 95% point of the cumulative distribution function may be adopted as the threshold. As another example, when a probability distribution in which the domain is closed bounded is used as the probability distribution of the low delay state, a value with a larger domain may be adopted as the threshold.

High delay distribution estimation unit 13 estimates the probability distribution of the high delay state (second communication delay state). High delay distribution estimation unit 13 estimates a probability density function on which the delay time of the high delay state is based from the delay time data classified into the high delay state by identification unit 12. In this estimation, assuming that a parametric distribution is used, the estimation of the distribution results in the problem of estimating a small number of parameters, which facilitates the estimation of the distribution. In this case, an example of the high delay state distribution will be described assuming that high delay distribution estimation unit 13 uses an exponential distribution represented by Equation (3).

[Math. 3]

$$f(x)=\alpha\exp(-\lambda x) \tag{3}$$

where parameter λ represents a parameter and a represents a normalization constant. High delay distribution estimation unit 13 performs fitting of the delay time data classified into the high delay state by using an optimization technique such as a least squares method, and thus the parameter λ for the distribution can be estimated.

Delay distribution prediction unit 14 predicts the probability distribution of a future communication delay, based on a mixed distribution of the low delay state and the high delay state. Delay distribution prediction unit 14 calculates the future low delay state and the future high delay state by using a ratio of distributions representing the low delay state and the high delay state in the past, and predicts the probability distribution of the future communication delay.

Figure 6:
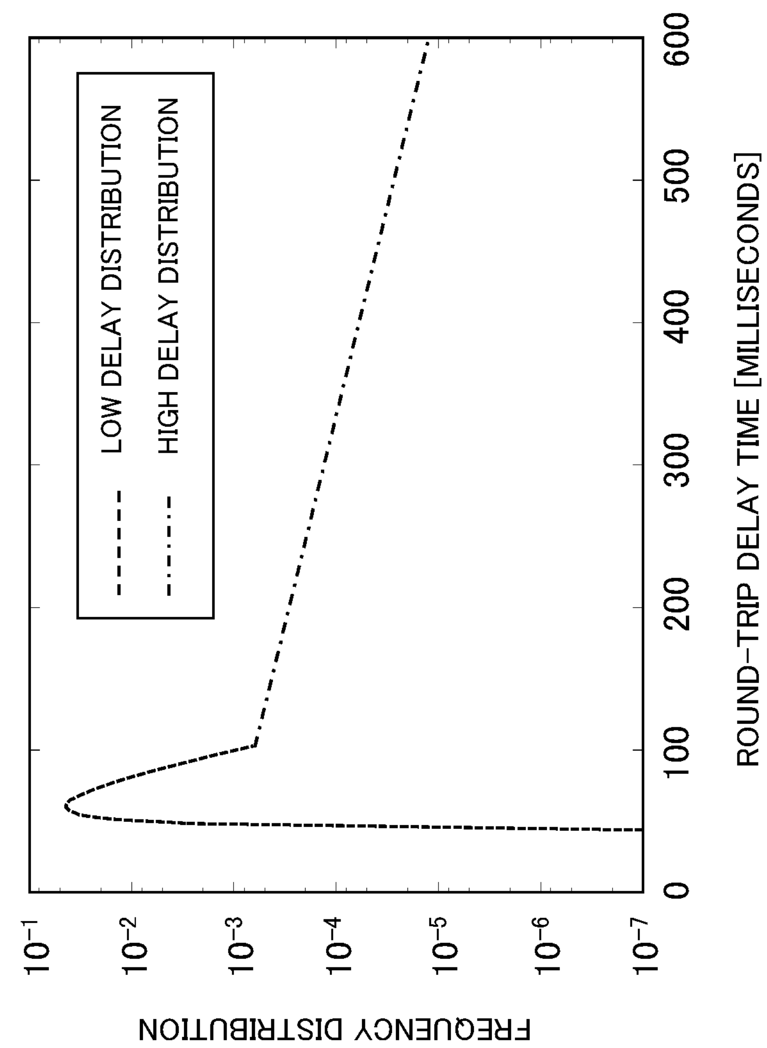
FIG. 6 is a graph illustrating a specific example of a low delay state distribution and a high delay state distribution which are related to the graph illustrated in FIG. 6.

Delay distribution prediction unit 14 models the current delay time distribution actually measured as illustrated in FIG. 5 by combining the estimated high delay state distribution with the low delay state distribution (see FIG. 6). FIG. 6 illustrates a specific example of each of the low delay state distribution and the high delay state distribution related to the graph illustrated in FIG. 5. Note that this modeling is equivalent to the determination of the probability p and the probability q.

An example of the method in which delay distribution prediction unit 14 determines values of the probabilities p and q will be described. The communication path takes either one of the low delay state and the high delay state, and the state is considered as a model for state transition based on the Markov process (see FIG. 3). Further, the packet sent in the low delay state is returned after a lapse of a delay time given by the low delay state distribution (e.g., gamma distribution). On the other hand, the packet sent in the high delay state is not returned until the state transitions to the low delay state. Accordingly, when the model that treats a wait time for the return as a delay time is used, the high delay state distribution is represented as the exponential distribution.

The values of the probabilities p and q, which are associated in one-to-one correspondence with averages of times present in succession between the low delay state and the high delay state in the measurement time, can be estimated from the data on the delay time.

For example, a period for acquiring the delay time data by delay distribution prediction unit 14 is set to a certain value $\Delta t$ (for example, 20 seconds in FIG. 2, for convenience of explanation). In this case, an expected value E(p) of times present in succession in the low delay state until the state transitions from the low delay state to the high delay state can be represented by the following Equation (4). Delay distribution prediction unit 14 estimates the value of the probability p assuming that the calculation result of the expected value is equal to the "average value of times present in succession in the low delay state during the period $\Delta T$" which is achieved by actual measurement. For example, as a result of observing the communication state for 20 seconds, the state transitions to the low delay state (seven seconds), the high delay state (two seconds), the low delay state (four seconds), the high delay state (three seconds), and the low delay state (four seconds) in this order. In this case, the "average value of times present in succession in the low delay state during the period $\Delta T$" is five seconds. Accordingly, it can be assumed that the solution to the expected value E(p) of times present in succession in the low delay state until the state transitions from the low delay state to the high delay state is "5".

[Math. 4]

$$E(p) = \sum_{n=1}^{\infty} n\Delta t(1-p)^n p \tag{4}$$

By a similar technique, an expected value E(q) of times present in succession in the high delay state until the state transitions from the high delay state to the low delay state can be represented by the following Equation (5). Accordingly, the value of the probability q can be estimated by using the Equation (5).

[Math. 5]

$$E(q) = \sum_{n=1}^{\infty} n\Delta t(1-q)^n q \tag{5}$$

Thus, a probability value (p, q) of probabilities p and q for each period $\Delta T$ is determined. Association between a pair of the probability values and a delay time distribution graph as illustrated in FIG. 6 will be described below.

A probability distribution function is configured by using a function having different shapes in a portion (low delay state) equal to or less than a threshold achieved by identification unit 12 and in a portion (high delay state) exceeding the threshold. The value achieved by integrating the probability distribution function from "0" to the threshold corresponds to the ratio of the communication state present in the low delay state during the time $\Delta T$. The relationship between the ratio and the probability value (p, q) will be described below.

For example, assuming that the transition illustrated in FIG. 3 is the simple Markov process, the expected value of the ratio of time for the low delay state can be represented by {q/(p+q)}. Accordingly, delay distribution prediction unit 14 performs adjustment by multiplying a constant by the probability distribution function of the low delay state in such a way that the integral value from "0" to the threshold also for the probability distribution function to be determined is represented by {q/(p+q)}. Specifically, when the integral value of the probability distribution function of the low delay state before adjustment is A, delay distribution prediction unit 14 uses the value achieved by multiplying [q/{A(p+q)}] (constant) by the entire function as a new probability distribution function of the low delay state. Also, for the high delay state, delay distribution prediction unit 14 performs adjustment by multiplying a constant [p/{A(p+q)}] by the integral value A described above, and uses the achieved value as a new probability distribution function of the high delay state. Shapes of the probability distribution graph of the low delay state and the probability distribution graph of the high delay state achieved as described above are related to the probability p and the probability q, respectively.

Delay distribution prediction unit 14 estimates a future delay time distribution from the probability value predicted in the manner described above. Delay distribution prediction unit 14 updates the probability value (p, q) intermittently, and stores a given number of past probability values (p, q) in a memory. The past probability values and the time-series prediction are used to estimate the future probability value (p, q). For example, in the actual measurement graph illustrated in FIG. 2, the actual measurement is made only until a lapse of about 150 seconds. However, after a lapse of 150 seconds, a distribution graph illustrated in FIG. 6 is generated by using the delay time predicted by delay distribution prediction unit 14.

(Operation of Delay Prediction Device)

Next, an operation of delay prediction device 10 will be described with reference to a flowchart illustrated in FIG. 7.

First, in step S101, delay time measurement unit 15 of delay prediction device 10 performs packet communication a plurality of times with communication destination terminal 4 via communication network 3. In this case, delay time measurement unit 15 measures the time (delay time) until a packet to be transmitted as a reply to the packet transmitted from delay prediction device 10 reaches from communication destination terminal 4.

In step S102, low delay distribution estimation unit 11 estimates the distribution of the low delay state. Specifically, low delay distribution estimation unit 11 estimates the probability density function (see Equation (1)) of the delay time related to the low delay state assuming that data on a shorter delay time among the measured delay times are in the low delay state. The probability density function (gamma distribution is used as one example in this example embodiment) is calculated based on the actually measured delay time and parameters (z, k, θ) achieved by estimation.

In step S103, identification unit 12 identifies the low delay state and the high delay state. Specifically, identification unit 12 determines the threshold for identifying the low delay state and the high delay state.

In step S104, high delay distribution estimation unit 13 estimates the distribution of the high delay state. Specifically, high delay distribution estimation unit 13 extracts data on the delay time of the high delay state, based on the threshold identified by identification unit 12, and estimates the probability density function (exponential distribution represented by Equation (3) is used as one example in this example embodiment) related to the delay time of the high delay state from the delay time data on the high delay state. Specifically, the distribution parameter for the function is estimated.

Lastly, in step S105, delay distribution prediction unit 14 predicts the probability distribution of the future delay time based on a mixed distribution of the low delay state and the high delay state. Specifically, delay distribution prediction unit 14 models the current delay time distribution actually measured as illustrated in FIG. 5 as in the graph illustrated in FIG. 6 by combining the estimated high delay state distribution with the low delay state distribution.

As described above, according to the first example embodiment of the present invention, it is possible to predict a future communication delay with high accuracy based on past communication delay data. This is because low delay distribution estimation unit 11 estimates the distribution of the low delay state by using the measured communication delay time, identification unit 12 distinguishes the low delay state from the high delay state, high delay distribution estimation unit 13 estimates the distribution of the high delay state, and delay distribution prediction unit 14 predicts the probability distribution of the future delay time by a mixed distribution of the low delay state and the high delay state.

Delay prediction device 10 according to the first example embodiment focuses on the fact that data has the low delay state and the high delay state in the communication delay time measured a plurality of times over a certain period of time, and the degree of the mixing is quantified by using a probability value. Further, how the probability value representing the mixing varies with time is predicted, and the future delay time distribution is indicated based on the predicted future probability value. The prediction of the probability value can also be achieved by, for example, a mathematical means such as an autoregressive model.

Modified Example 1

A modified example of delay prediction device 10 according to the first example embodiment of the present invention will be described below. In the first example embodiment, delay distribution prediction unit 14 estimates the future delay time distribution from the predicted probability value. However, delay distribution prediction unit 14 may calculate a future delay time based on information including the probability distribution of the future communication delay, and may output predicted delay information including the future delay time. Note that the predicted delay information includes at least one of the probability distribution of the future communication delay, the future delay time, and the communication delay state (low delay state or high delay state) identified by identification unit 12.

For example, delay distribution prediction unit 14 acquires, for example, an appropriate percentage point, from the delay time distribution function (probability distribution of the future communication delay), thereby achieving the predicted value (future delay time) of the future delay time as a point estimated value. In the example described above, since the exponential distribution is used as a high delay distribution, a 100% point is constantly infinite. In the distribution in which the domain is in a semi-infinite interval, like in the exponential distribution, a finite value is achieved as the predicted value. For this reason, for example, a 95% point may be adopted as the predicted value. Thus, the value output from delay distribution prediction unit 14 can also be used for determining retransmission time-out for TCP communication as described above in the "Background Art" section. The value (future delay time) output from delay distribution prediction unit 14 may be displayed on an external output device, such as a monitor, as predicted delay information. Note that a unit other than delay distribution prediction unit 14 may be caused to execute processing of calculating the delay time based on the distribution described above.

Second Example Embodiment (Delay Prediction System)

Delay prediction system 100 according to a second example embodiment of the present invention will be described with reference to FIG. 8. Delay prediction system 100 includes delay prediction device 10*a* including the configuration of delay prediction device 10 according to the first example embodiment, and control target device 17 to be controlled by delay prediction device 10*a*. Delay prediction device 10*a* and control target device 17 are connected via communication network 3 by radio communication or the like. Note that control unit 16 may be installed outside of delay prediction device 10*a*.

Figure 8:
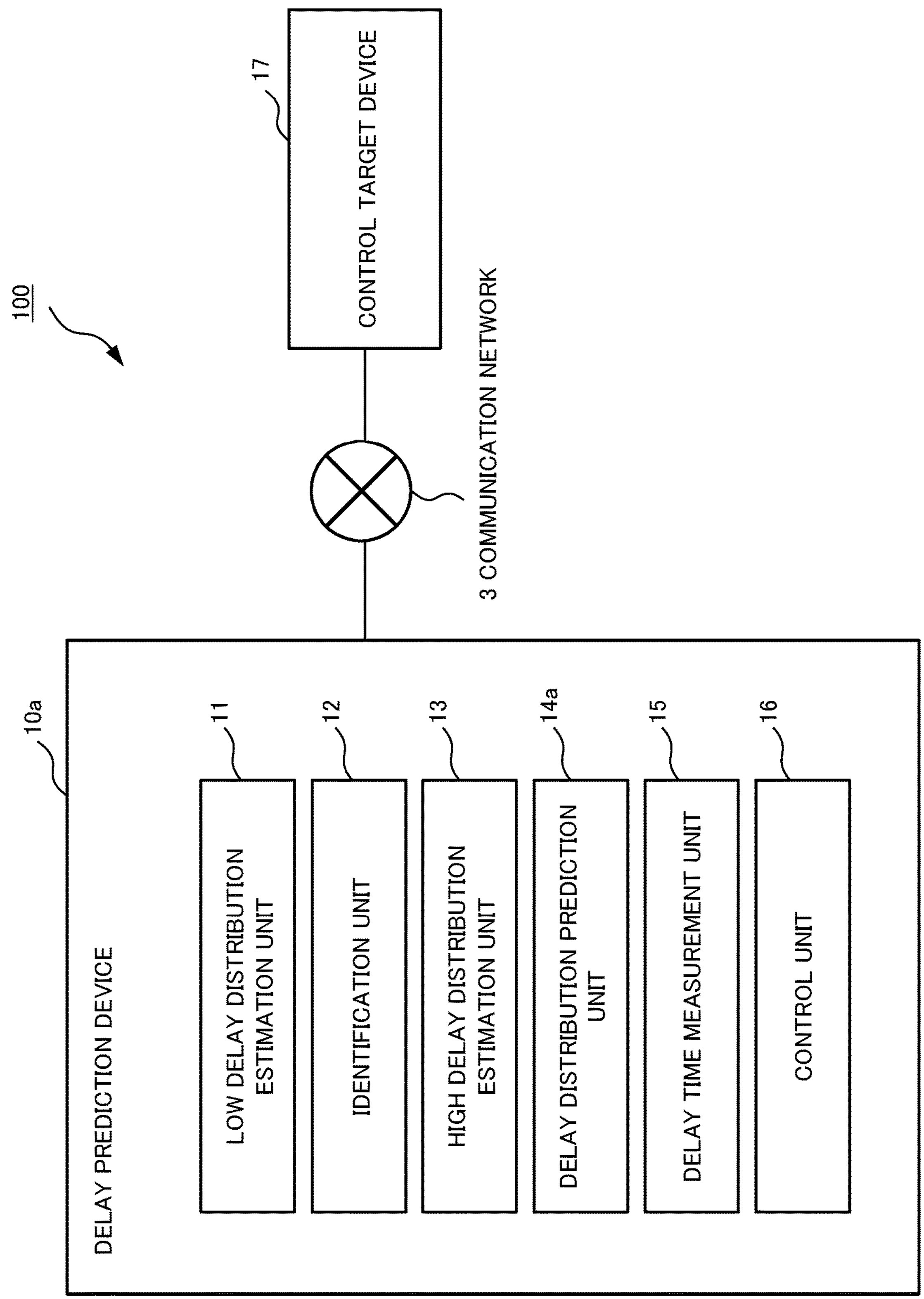
FIG. 8 is a diagram illustrating a configuration example of a delay prediction system according to a second example embodiment of the present invention.

As illustrated in FIG. 8, delay prediction device 10*a* includes low delay distribution estimation unit 11, identification unit 12, high delay distribution estimation unit 13, delay distribution prediction unit 14*a*, delay time measurement unit 15, and control unit 16. Control unit 16 transmits a signal for controlling control target device 17 via communication network 3.

In addition to the function of delay distribution prediction unit 14, delay distribution prediction unit 14*a* calculates any percentage point in the estimated delay time distribution and calculates an estimated delay time based on the percentage point as described above in Modified Example 1.

Control target device 17 receives a control signal from delay prediction device 10*a* and performs a predetermined operation based on the control signal. For example, when control target device 17 is a motor whose rotational speed is variable, the speed of the motor is changed based on an increase or decrease in the delay time predicted by delay distribution prediction unit 14. In other words, an operation speed of control target device 17 can be controlled depending on a congestion state of communication network 3.

For example, when it is predicted that a state of communication network 3 may be congested, i.e., when the predicted delay time achieved from delay distribution prediction unit 14 is large, a delay in transmission of the control signal to the motor (control target device 17) is estimated. Accordingly, the operation speed of the motor is set to be decreased. Consequently, it is possible to prevent the state of a device to be driven by the motor from being different from a desired state, or it is possible to decrease the difference.

(Operation of Delay Prediction System)

Next, an operation of delay prediction system 100 will be described with reference to a flowchart illustrated in FIG. 9.

Figure 7:
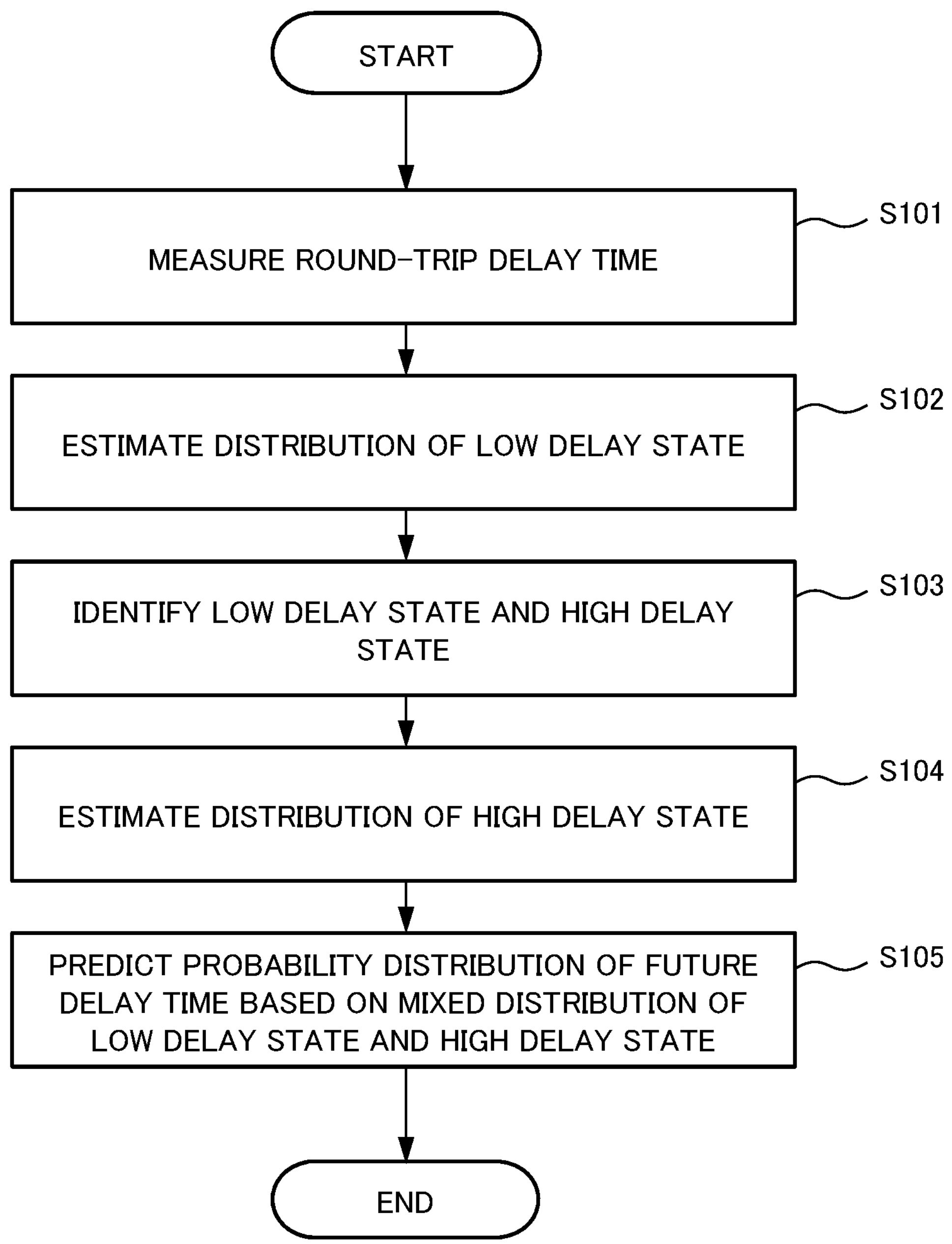
FIG. 7 is a flowchart illustrating an operation of the delay prediction device according to the first example embodiment of the present invention.

Steps S201 to S205 are similar to steps S101 to S105, respectively, in the flowchart illustrated in FIG. 7.

In step S206, delay distribution prediction unit 14*a* calculates any percentage point of the estimated delay time distribution, and calculates the estimated delay time based on the percentage point. Delay distribution prediction unit 14*a* transmits information about a delay, including at least the calculated estimated delay time, to control target device 17 via communication network 3. Note that the information about the delay may include control information or the like related to the estimated delay time.

In step S207, upon receiving the information about the delay, control target device 17 controls the own device based on the estimated delay time and control information included in the information. For example, when control target device 17 is a motor, the operation speed of the motor is adjusted. Note that the control information may be generated by a delay prediction device 10*a* side, based on the estimated delay time. Alternatively, the control information may be generated by a control target device 17 side, based on the estimated delay time received from the delay prediction device 10*a* side.

As described above, according to delay prediction system 100 according to the second example embodiment of the present invention, the delay prediction device can predict a future communication delay with high accuracy, based on past communication delay data and control target device 17 can be controlled based on the prediction. This is because delay prediction device 10*a* classifies communication delay times measured a plurality of times over a certain period of time into the low delay state and the high delay state, quantifies a degree of mixing of the two delay states by using a probability value, and predicts how the probability value representing the mixing varies with time. Further, control target device 17 executes the control based on the predicted future probability value.

Third Example Embodiment

Figure 10:
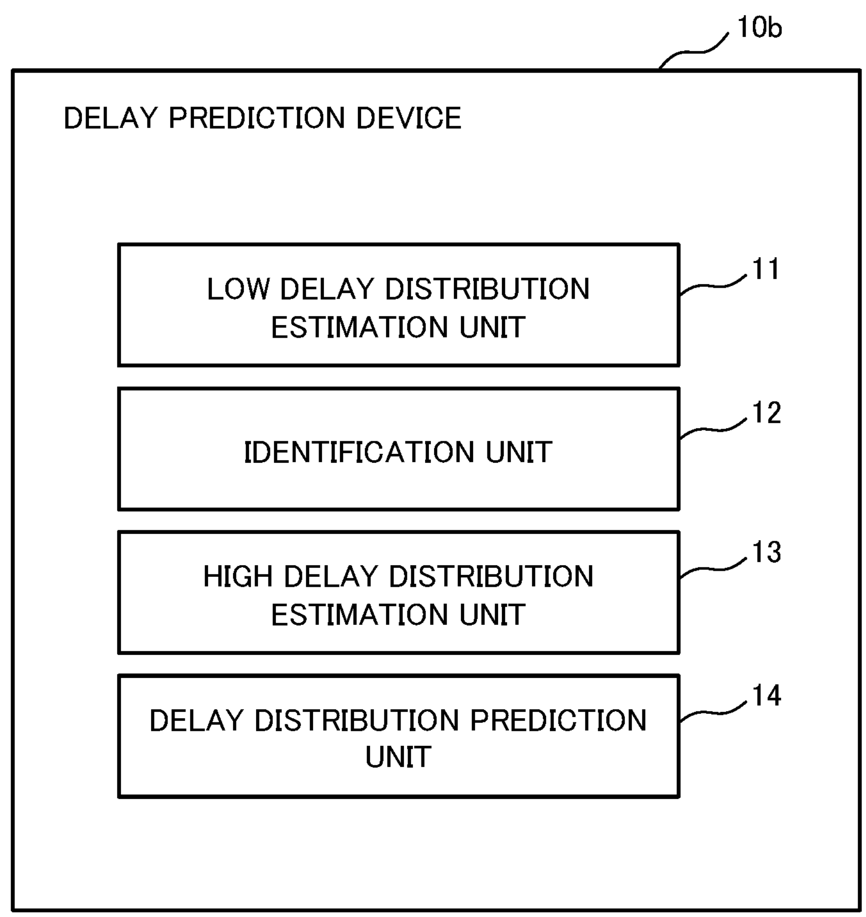
FIG. 10 is a diagram illustrating a configuration example of a delay prediction device according to a third example embodiment of the present invention.

As illustrated in FIG. 10, delay prediction device 10*b* according to a third example embodiment of the present invention is a minimum configuration for carrying out the delay prediction device according to the first and second example embodiments. Delay prediction device 10*b* includes low delay distribution estimation unit 11, identification unit 12, high delay distribution estimation unit 13, and delay distribution prediction unit 14.

Low delay distribution estimation unit 11 estimates a probability distribution of a first communication delay state by using a result of measuring a communication delay of a packet in a network. Identification unit 12 identifies whether a state of the communication delay is the first communication delay state or a second communication delay state in which the communication delay is greater than the communication delay in the first communication delay state. High delay distribution estimation unit 13 estimates a probability distribution of the second communication delay state. Delay distribution prediction unit 14 predicts a probability distribution of a future communication delay based on the probability distribution of the first communication delay state and the probability distribution of the second communication delay state.

According to the third example embodiment of the present invention, it is possible to predict a future communication delay with high accuracy based on past communication delay data. This is because low delay distribution estimation unit 11 estimates the distribution of the low delay state by using the measured communication delay time in delay prediction device 10*b*, identification unit 12 distinguishes the low delay state from the high delay state, high delay distribution estimation unit 13 estimates the distribution of the high delay state, and delay distribution prediction unit 14 predicts the probability distribution of the future delay time based on the mixed distribution of the low delay state and the high delay state.

(Configuration of Information Processing Apparatus)

Figure 11:
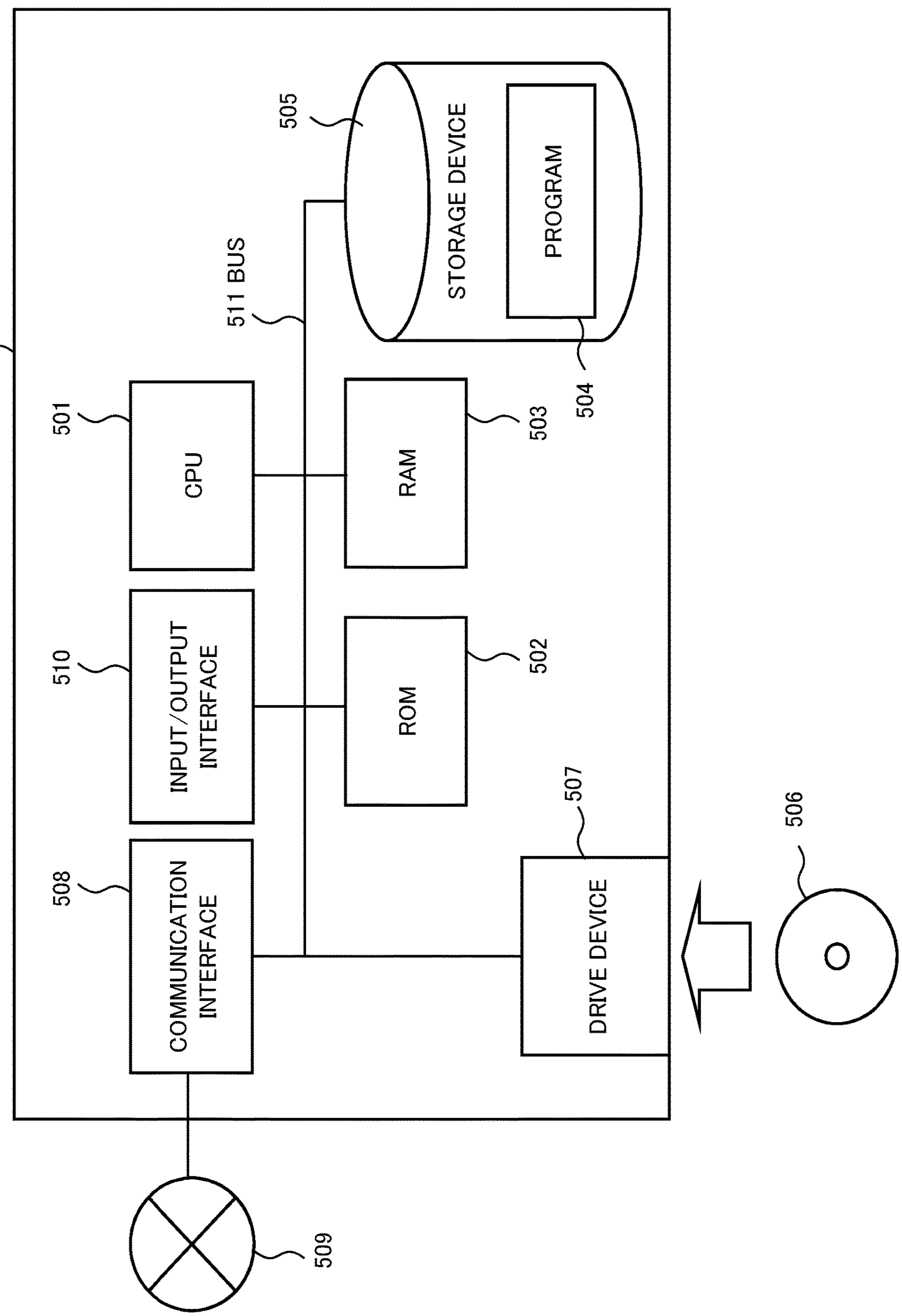
FIG. 11 is a diagram illustrating a configuration example of an information processing apparatus that can be used in each example embodiment.

According to each example embodiment of the present invention described above, the components in the delay prediction devices illustrated in FIGS. 1, 8, and 10 indicate functional unit blocks. Some or all of the components of the delay prediction device are implemented by any combination of, for example, information processing apparatus 1 as illustrated in FIG. 11, and a program. Information processing apparatus 1 includes, for example, the following components.

Central Processing Unit (CPU) 501

Read Only Memory (ROM) 502

Random Access Memory (RAM) 503

Program 504 to be loaded to RAM 503

Storage device 505 that stores program 504

Drive device 507 that reads or writes from or to recording medium 506

Communication interface 508 to be connected to communication network 509

Input/output interface 510 that inputs or outputs data

Bus 511 that connects components

Each component in the delay prediction device according to each example embodiment of the present invention is implemented in such a manner that CPU 501 acquires program 504 for implementing these functions and executes the program. Program 504 for implementing the functions of the components of the delay prediction device is preliminarily stored in, for example, storage device 505 or RAM 503, and is read out by CPU 501 as needed. Note that program 504 may be supplied to CPU 501 via communication network 509. Alternatively, the program may be preliminarily stored in recording medium 506 and drive device 507 may read out the program and supply the program to CPU 501.

As a method for implementing each device, there are various modified examples. For example, the delay prediction device may be implemented by any combination of individual information processing apparatuses for respective components and a program. Further, a plurality of components included in the delay prediction device may be implemented by any combination of single information processing apparatus 1 and a program.

Furthermore, some or all of the components of the delay prediction device are implemented by other general-purpose or dedicated circuitry, a processor, and the like, or a combination thereof. These may be configured by using a single chip, or may be configured by using a plurality of chips connected via a bus.

Some or all of the components of the delay prediction device may be implemented by a combination of the above-described circuits or the like and the program.

When some or all of the components of the delay prediction device are implemented by a plurality of information processing apparatuses, circuits, and the like, the plurality of information processing apparatuses, circuits, and the like may be arranged in a centralized manner, or may be arranged in a distributed manner. For example, the information processing apparatuses, circuits, and the like may be implemented by a configuration in which a client and server system, a cloud computing system, and the like are connected via a communication network.

While the present invention has been described above with reference to the example embodiments, the present invention is not limited to the example embodiments and examples described above. The configuration and details of the present invention can be modified in various ways that can be understood by a person skilled in the art within the scope of the present invention.

The whole or part of the example embodiments disclosed above can be described as, but not limited to, the following supplementary notes.

[Supplementary Note 1]

A delay prediction device comprising:

a low delay distribution estimation means that estimates a probability distribution of a first communication delay state by using a result of measuring a communication delay of a packet in a network;

an identification means that identifies whether a state of the communication delay is the first communication delay state or a second communication delay state in which the communication delay is greater than the communication delay in the first communication delay state;

a high delay distribution estimation means that estimates a probability distribution of the second communication delay state; and a delay distribution prediction means that predicts a probability distribution of a future communication delay, based on a probability distribution of the first communication delay state and a probability distribution of the second communication delay state.

[Supplementary Note 2]

The delay prediction device according to Supplementary note 1, wherein the delay distribution prediction means calculates a future delay time, based on information including a probability distribution of the future communication delay, and outputs predicted delay information including the future delay time.

[Supplementary Note 3]

The delay prediction device according to Supplementary note 2, wherein the predicted delay information includes at least one of:

a probability distribution of the future communication delay;

the future delay time; and one of the first communication delay state and the second communication delay state as a state of the communication delay identified by the identification means.

[Supplementary Note 4]

The delay prediction device according to any one of Supplementary notes 1 to 3, wherein the delay distribution prediction means predicts a probability distribution of the future communication delay, based on a first value and a second value, the first value being achieved by normalizing an integral value of a probability distribution of the first communication delay state by using an expected value of a ratio of time for the first communication delay state, the second value being achieved by normalizing an integral value of a probability distribution of the second communication delay state by using an expected value of a ratio of time for the second communication delay state.

[Supplementary Note 5]

The delay prediction device according to any one of Supplementary notes 1 to 4, wherein estimation of a distribution of at least one of the first communication delay state and the second communication delay state is executed by estimating a parameter of a parametric probability distribution.

[Supplementary Note 6]

The delay prediction device according to any one of Supplementary notes 1 to 5, wherein a gamma distribution is used as a distribution representing the first communication delay state.

[Supplementary Note 7]

The delay prediction device according to any one of Supplementary notes 1 to 5, wherein an exponential distribution is used as a distribution representing the second communication delay state.

[Supplementary Note 8]

A delay prediction system comprising:

the delay prediction device according to any one of Supplementary notes 1 to 7, which is capable of remotely controlling a certain operation via a network; and a control target device that executes the operation in response to the remote control from the delay prediction device, the delay prediction device and the control target device being communicably connected, wherein the delay prediction device determines the remote control for the control target device, based on predicted delay information including a future delay time predicted based on a communication delay predicted by using a result of measuring a communication delay of a packet in the network.

[Supplementary Note 9]

A delay prediction method comprising:

estimating a probability distribution of a first communication delay state by using a result of measuring a communication delay of a packet in a network;

identifying whether a state of the communication delay is the first communication delay state or a second communication delay state in which the communication delay is greater than the communication delay in the first communication delay state;

estimating a probability distribution of the second communication delay state; and predicting a probability distribution of a future communication delay, based on a probability distribution of the first communication delay state and a probability distribution of the second communication delay state.

[Supplementary Note 10]

A program for causing a computer to execute:

estimating a probability distribution of a first communication delay state by using a result of measuring a communication delay of a packet in a network;

identifying whether a state of the communication delay is the first communication delay state or a second communication delay state in which the communication delay is greater than the communication delay in the first communication delay state;

estimating a probability distribution of the second communication delay state; and predicting a probability distribution of a future communication delay, based on a probability distribution of the first communication delay state and a probability distribution of the second communication delay state.

[Supplementary Note 11]

The delay prediction device according to Supplementary note 1 or 3, wherein, assuming that a probability of transition from the first communication delay state to the second communication delay state is represented by p and a probability of transition from the second communication delay state to the first communication delay state is represented by q, the delay distribution prediction means predicts a probability distribution of the future communication delay by performing normalization in such a way that an integral value of a probability distribution representing a first communication delay state is represented by q/(p+q) and an integral value of a probability distribution representing a second communication delay state is represented by p/(p+q).

[Supplementary Note 12]

The delay prediction device according to Supplementary note 1, wherein a communication delay of the packet in the network is a round-trip delay time during which a packet makes a round trip between an own device and a certain communication destination terminal via the network.

[Supplementary Note 13]

The delay prediction device according to Supplementary note 1, wherein, in a case where a communication delay of the packet in the network is measured, when the packet is not returned after a lapse of a predetermined time since the packet is transmitted, a preset time is used as a round-trip delay time of the packet.

This application is based upon and claims the benefit of priority from Japanese patent application No. 2017-051409, filed on Mar. 16, 2017, the disclosure of which is incorporated herein in its entirety by reference.

REFERENCE SIGNS LIST

1: Information processing apparatus
3: Communication network
4: Communication destination terminal
5: Display device
10: Delay prediction device
**10*a***: Delay prediction device
**10*b***: Delay prediction device
11: Low delay distribution estimation unit
12: Identification unit
13: High delay distribution estimation unit
14: Delay distribution prediction unit
**14*a***: Delay distribution prediction unit
15: Delay time measurement unit
16: Control unit
17: Control target device
100: Delay prediction system
501: CPU
503: RAM
504: Program
505: Storage device
506: Recording medium
507: Drive device
508: Communication interface
509: Communication network
510: Input/output interface
511: Bus

The invention claimed is:

1. A delay prediction device comprising:

a memory storing instructions; and at least one processor configured to process the instructions for:

estimating a probability distribution of a first communication delay state by using a result of measuring a communication delay of a packet in a network;

identifying whether a state of the communication delay is the first communication delay state or a second communication delay state in which the communication delay is greater than the communication delay in the first communication delay state;

estimating a probability distribution of the second communication delay state; and predicting a probability distribution of a future communication delay, based on a probability distribution of the first communication delay state and a probability distribution of the second communication delay state;

the predicting further comprising, predicting a probability distribution of the future communication delay, based on a first value and a second value, the first value being achieved by normalizing an integral value of a probability distribution of the first communication delay state by using an expected value of a ratio of time for the first communication delay state, the second value being achieved by normalizing an integral value of a probability distribution of the second communication delay state by using an expected value of a ratio of time for the second communication delay state.

2. The delay prediction device according to claim 1, wherein an exponential distribution is used as a distribution representing the second communication delay state.

3. The delay prediction device according to claim 1, wherein a gamma distribution is used as a distribution representing the first communication delay state.

4. The delay prediction device according to claim 1, wherein estimation of a distribution of at least one of the first communication delay state and the second communication delay state is executed by estimating a parameter of a parametric probability distribution.

5. The delay prediction device according to claim 1, wherein, assuming that a probability of transition from the first communication delay state to the second communication delay state is represented by p and a probability of transition from the second communication delay state to the first communication delay state is represented by q, the predicting further comprising predicting a probability distribution of the future communication delay by performing normalization in such a way that an integral value of a probability distribution representing a first communication delay state is represented by q/(p+q) and an integral value of a probability distribution representing a second communication delay state is represented by p/(p+q).

6. The delay prediction device according to claim 1, wherein a communication delay of the packet in the network is a round-trip delay time during which a packet makes a round trip between an own device and a certain communication destination terminal via the network.

7. The delay prediction device according to claim 1, wherein, in a case where a communication delay of the packet in the network is measured, when the packet is not returned after a lapse of a predetermined time since the packet is transmitted, a preset time is used as a round-trip delay time of the packet.

8. The delay prediction device according to claim 1, wherein estimation of a distribution of at least one of the first communication delay state and the second communication delay state is executed by estimating a parameter of a parametric probability distribution.

9. The delay prediction device according to claim 1, the predicting further comprising, calculating a future delay time, based on information including a probability distribution of the future communication delay, and outputting predicted delay information including the future delay time.

10. The delay prediction device according to claim 9, wherein estimation of a distribution of at least one of the first communication delay state and the second communication delay state is executed by estimating a parameter of a parametric probability distribution.

11. The delay prediction device according to claim 9, wherein the predicted delay information includes at least one of:

a probability distribution of the future communication delay;

the future delay time; and one of the first communication delay state and the second communication delay state as a state of the communication delay identified.

12. The delay prediction device according to claim 11, the predicting further comprising, predicting a probability distribution of the future communication delay, based on a first value and a second value, the first value being achieved by normalizing an integral value of a probability distribution of the first communication delay state by using an expected value of a ratio of time for the first communication delay state, the second value being achieved by normalizing an integral value of a probability distribution of the second communication delay state by using an expected value of a ratio of time for the second communication delay state.

13. The delay prediction device according to claim 11, wherein estimation of a distribution of at least one of the first communication delay state and the second communication delay state is executed by estimating a parameter of a parametric probability distribution.

14. The delay prediction device according to claim 11, wherein, assuming that a probability of transition from the first communication delay state to the second communication delay state is represented by p and a probability of transition from the second communication delay state to the first communication delay state is represented by q, the predicting further comprising predicting a probability distribution of the future communication delay by performing normalization in such a way that an integral value of a probability distribution representing a first communication delay state is represented by $q/(p+q)$ and an integral value of a probability distribution representing a second communication delay state is represented by $p/(p+q)$.

15. A delay prediction method comprising:

estimating a probability distribution of a first communication delay state by using a result of measuring a communication delay of a packet in a network;

identifying whether a state of the communication delay is the first communication delay state or a second communication delay state in which the communication delay is greater than the communication delay in the first communication delay state;

estimating a probability distribution of the second communication delay state; and predicting a probability distribution of a future communication delay, based on a probability distribution of the first communication delay state and a probability distribution of the second communication delay state;

the predicting further comprising, predicting a probability distribution of the future communication delay, based on a first value and a second value, the first value being achieved by normalizing an integral value of a probability distribution of the first communication delay state by using an expected value of a ratio of time for the first communication delay state, the second value being achieved by normalizing an integral value of a probability distribution of the second communication delay state by using an expected value of a ratio of time for the second communication delay state.

16. A non-transitory computer-readable recording medium storing a program for causing a computer to execute:

estimating a probability distribution of a first communication delay state by using a result of measuring a communication delay of a packet in a network;

identifying whether a state of the communication delay is the first communication delay state or a second communication delay state in which the communication delay is greater than the communication delay in the first communication delay state;

estimating a probability distribution of the second communication delay state; and predicting a probability distribution of a future communication delay, based on a probability distribution of the first communication delay state and a probability distribution of the second communication delay state;

the predicting further comprising, predicting a probability distribution of the future communication delay, based on a first value and a second value, the first value being achieved by normalizing an integral value of a probability distribution of the first communication delay state by using an expected value of a ratio of time for the first communication delay state, the second value being achieved by normalizing an integral value of a probability distribution of the second communication delay state by using an expected value of a ratio of time for the second communication delay state.

* * * * *